Sept. 11, 1962  J. S. CAMPBELL  3,053,270
HIGH PRESSURE BALL RELIEF VALVE
Filed Feb. 9, 1960
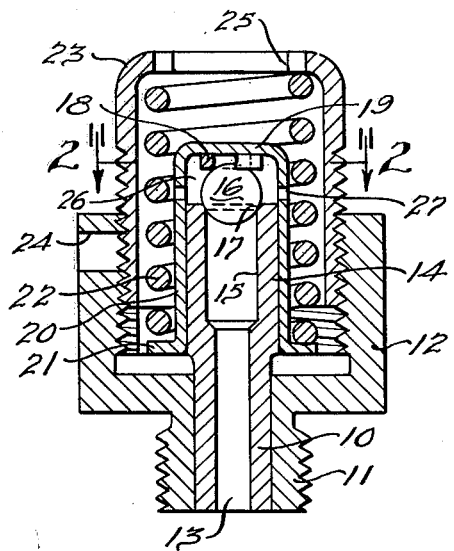
Fig. 1.
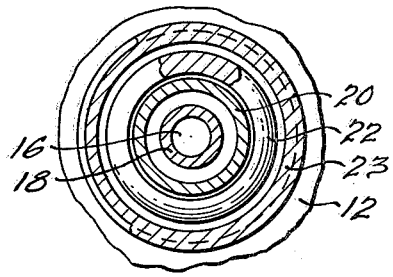
Fig. 2.
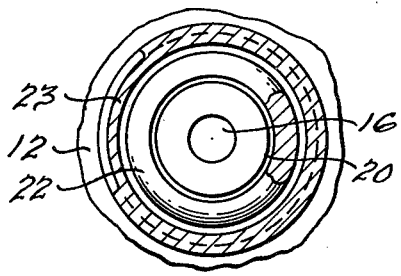
Fig. 3.
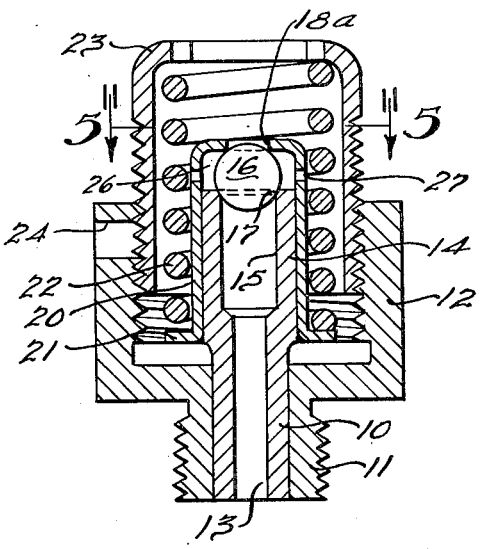
Fig. 4.
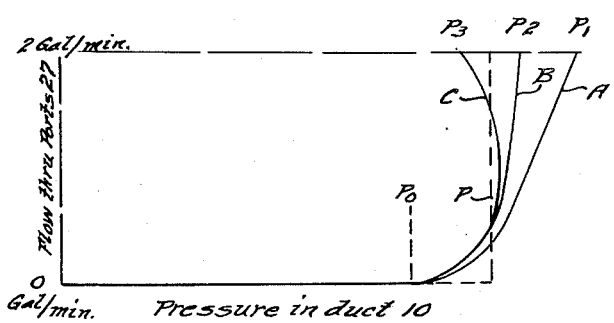
INVENTOR.
James S. Campbell.
BY Harness & Harris
ATTORNEYS.

3,053,270
HIGH PRESSURE BALL RELIEF VALVE
James S. Campbell, Highland Park, Mich., assignor to Chrysler Corporation, Highland Park, Mich., a corporation of Delaware
Filed Feb. 9, 1960, Ser. No. 7,628
4 Claims. (Cl. 137—469)

This invention relates to ball relief valves and in particular to a valve adapted for use in high pressure fluid systems, as for example in the bypass circuit of an automobile power steering pump wherein a comparatively high pressure fluid must flow through the relief valve with a minimum of valve noise. This application is a continuation-in-part of my copending application Serial No. 802,237, filed March 26, 1959, which issued as Patent No. 2,933,103, April 27, 1960.

An object of the present invention is to provide an improved valve of the foregoing type which is comparatively simple and economical in construction, yet which is particularly efficient and relatively noise free in operation.

Another and more specific object is to provide such a valve comprising a ball element adapted to seat positively at the fluid discharge opening of a tubular conduit to close the latter and to be moved from its seated position to allow fluid flow from the conduit when the fluid pressure therein exceeds a predetermined value. The ball is yieldingly urged to its seated position in opposition to the discharge pressure in the conduit by means of an inverted cup-shaped ball guide which overlies and seats against the ball and has depending sides sleeved over the conduit in axial sliding relationship. The guide is resiliently urged against the ball to maintain the same at its seated position until the pressure in the conduit exceeds said predetermined value. The portion of the cup-shaped guide overlying the ball comprises a chamber which immediately fills with fluid when the ball is unseated. A restricted port in the chamber portion of the guide communicates with a fluid return flow conduit, which returns the fluid to a sump or to the inlet side of the pump, and gives rise to a secondary or assisting pressure in consequence of the pressure drop between the interior of the chamber and the return flow conduit.

Prior to unseating of the ball from the discharge opening, the fluid pressure in the conduit is the sole force tending to unseat the ball. This force is resisted by the resiliently urged guide seated against the ball. When the ball is unseated, the conduit pressure acting thereon is then assisted by the force of the aforesaid secondary pressure which urges the guide axially from the discharge opening to assure a positive and comparatively noise-free valve operation. In consequence of the improved valve structure described, including the restricted orifice and the secondary or assisting pressure urging axial displacement of the ball guide away from the seat at the discharge opening, an improved valve operating characteristic is readily achieved which is believed to be largely responsible for the quiet operation of the valve.

For example, it is apparent that if the secondary pressure is not employed, the ball will begin to unseat at a predetermined conduit pressure, depending on the resilient force acting on the ball guide. As the conduit pressure continues to increase, unseating of the ball progressively increases until the total capacity of the pump is bypassed through the discharge opening. Such an operating characteristic is undesirable at the outset, particularly for a high pressure system because the pressure rise between the initial unseating of the ball and the final unseated position excessively increases the load on the pump and other operating parts of the system when the valve is at its optimum open condition. A preferred valve operating characteristic would accomplish unseating of the valve to its optimum extent within a comparatively narrow pressure range, so that the pressure in the fluid system remains at a substantially desired predetermined value at all times. Also presumably because of the practical impossibility of obtaining a perfectly symmetrical valve construction in production, when the sole force tending to unseat the ball is the pressure force of the fluid discharging through the conduit discharge opening, unbalanced forces arise within the valve mechanism which cause vibration and spinning of the ball with consequent objectionable valve noise or chattering.

In addition, the larger the secondary pressure within the chamber of the guide, the less will be the pressure drop between the discharge opening of the tubular conduit and the interior of the chamber, because the total pressure drop from the discharge opening to the chamber and thence from the chamber to the return flow conduit is constant for any given pump pressure. It has been discovered that if the total assisting force of the secondary pressure is not excessive for any given valve construction, the smaller the pressure drop between the discharge opening and the chamber, the quieter will be the valve operation, presumably because the greater will be the opening between the ball and its seat and the slower will be the fluid velocity for any given quantity of fluid flow per unit time.

It has been found on the other hand that if the total force of the secondary or assisting pressure urging axial movement of the ball guide from the discharge opening is excessive, such that the pressure in the system tends to be lower when the ball is at its optimum unseated position than when the ball is partially unseated, oscillatory pressure forces acting on the ball and guide will again cause objectionable valve noise. Also the lower pressure at the optimum unseated position is objectionable because operation of the mechanism actuated by the fluid pressure will be impaired.

Another object is to provide an improved high pressure bypass valve having an axially shiftable guide means for the ball, the guide means having a smooth backing surface confronting the ball in opposition to the valve seat at the conduit opening. An annular shiftable seat for the ball is interposed between the latter and the smooth backing surface of the guide means, thereby to urge the ball resiliently into its seated position at the conduit opening. The smooth backing surface of the guide means freely enables transverse adjustment of the shiftable seat with respect to the axis of the conduit opening, thereby to enable transverse adjustment of the ball to a stable balanced position in the fluid flow stream while retaining the ball in seated position at the shiftable seat when the ball becomes unseated from the conduit opening.

Another object of the invention is to provide a particular simple and efficient ball guide comprising a unitary inverted cup-shaped guide member having depending cylindrical sides sleeved over the conduit as aforesaid and having a bore in its upper end of less diameter than the diameter of the ball and coaxial with the conduit opening to comprise said shiftable seat integral with the ball guide means. The ball seats in the bore of the cup-shaped member to close the same, and is thus maintained in fixed position with respect to the guide member and substantially in axial alignment with the conduit opening. A slight freedom of movement of the guide member transversely of the axis of the conduit opening is permitted to enable alignment of the ball and guide member to adjust to a stable balanced position in the fluid stream.

Other objects of this invention will appear in the following description and appended claims, reference being had to the accompanying drawings forming a part of this specification wherein like reference characters designate corresponding parts in the several views.

FIGURE 1 is a longitudinal mid-sectional view through a valve assembly involving the present invention.

FIGURE 2 is a transverse sectional view taken in the direction of the arrows substantially along the line 2—2 of FIGURE 1.

FIGURE 3 is a diagram showing the relationship between the rate of bypass flow and the pump discharge pressure.

FIGURE 4 is a view similar to FIGURE 1 illustrating a modification of the invention.

FIGURE 5 is a transverse sectional view taken in the direction of the arrows substantially along the line 5—5 of FIGURE 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings and particularly to FIGURES 1–3, a valve embodying the invention is illustrated comprising a tubular conduit 10 press fitted into the tubular bore of an externally threaded end 11 of a housing 12. The lower threaded extension 11 is adapted for connection with a fluid circuit, as for example the high pressure side of a fluid pump for an automobile power steering system. In such an application, high pressure fluid in a bypass circuit for the pump enters the conduit 10 at 13, then discharges to the low pressure or inlet side of the pump in accordance with operation of the valve as described below.

The conduit 10 and extension 11 are interfitted in fluid sealing engagement to prevent leakage of fluid therebetween. The upper portion of conduit 10 comprises a tubular stem 14 having a terminal bore enlargement 15 against which seats a ball valve element 16. Preferably the bore of the enlargement 15 is dimensioned with respect to the diameter of the ball 16 so that the latter meets the wall of the bore 15 at approximately a 45° angle. In order to provide a suitable fixed seat for the ball 16, the upper end of the bore enlargement 15 is chamfered slightly at 17.

Diametrically opposite the seat 17 is an adjustable annular washer type seat 18 having its lower inner circumference chamfered similarly to the seat 17 to provide an upper seating surface for the ball 16. The adjustable seat 18 is yieldingly urged downwardly against the ball 16 by suitable means including a rigid backing 19 having tubular sides 20 slidably sleeved over the mating smooth exterior of stem 14 in substantially fluid sealing relation therewith. The lower ends of the sides 20 terminate in an outwardly projecting annular foot flange 21 which comprises a retainer for a coil spring 22 under compression against the upper portion of a housing cap 23. The latter comprises a tubular externally threaded lower portion screwed into an enlarged bore portion of housing 12 in spaced relationship around the spring 22 to allow vertical or axial sliding movement of the sides 20 and to enable suitable pretensioning of spring 22. A staking hole 24 is provided in the housing 12 whereby the threads of cap 23 may be deformed by a suitable tool to prevent disassembly of the cap 23. The upper end of cap 23 is provided with a large fluid return opening 25 which discharges directly to the aforementioned sump or low pressure return side of the power steering pump.

The member 19, 20 comprises an inverted cup-shaped ball guide which in cooperation with the stem 14 encloses a fluid chamber 26, whereby fluid pressure within the chamber 26 exerted against the backing 19 tends to cause vertical axial movement of the latter against the tension of spring 22. In order to assist the pressure within conduit 10 tending to unseat the ball 16 when the pump pressure entering at 13 exceeds a predetermined limiting value, the sides 20 are provided with a plurality of restricted discharge ports 27 opening into chamber 26 to maintain a desired assisting pressure therein to effect the aforesaid axial upward movement of guide member 19, 20 against the tension of spring 22. Otherwise, at pressures within conduit 10 below the aforesaid limiting value, the spring 22 urges the guide member and ball 16 downwardly against seat 17 in fluid sealing relation to prevent upward fluid flow from stem 14. When the pressure within the bore of conduit 10 exceeds the limiting value determined by the tension of the spring 22, ball 16 will be raised from its seat 17 to enable passage of fluid from stem 14 into chamber 26, thence through the restricted ports 27 to the interior of housing cap 23, and via port 25 to the pump return.

The confronting surfaces of the sliding seat 18 and backing 19 are flat and smooth in a plane perpendicular to the axis of the stem 14. Upon movement of ball 16 from seat 17 to enable fluid flow through the valve assembly, seat 18 is readily adjustable transversely of the aforesaid axis so as to maintain itself in seated position with respect to the ball and to accommodate itself to transverse displacement of the latter. In this action, the ball 16 presumably swings or pivots laterally in one direction or another about one portion of the seat 17 and away from the diametrically opposite portion of the seat 17. The upper smooth surface of the adjustable seat 18 provides sufficient load bearing contact with the mating smooth surface of the backing 19 so as not to be embedded thereinto in consequence of the high fluid pressure acting on the ball.

By virtue of the shiftable seat 18, the ball 16 cannot become embedded in the backing 19 at a fixed location, so that chattering of the ball resulting from unbalanced fluid forces acting thereon is avoided. Instead, the seat 18 readily accommodates itself to lateral or transverse movement of the ball and enables the same to position itself freely in the fluid flow path in accordance with fluid pressure forces acting on the ball. The friction between the seat 18 and backing 19 is insufficient to prevent the ball from aligning itself properly in the fluid flow path and from seating properly at seat 17. However this friction does damp minor oscillatory movements of the ball that would occur, for example, if the ball were supported in a customary manner merely by a coil spring. The ball thus assumes a stable balanced position in the flow path, whereby chattering and vibration of the ball is minimized and a highly efficient quietly operating valve is obtained.

It has also been found that the less the pressure differential between the fluid in chamber 26 and the fluid in stem 14, for any given rate of fluid flow around the unseated ball 16, the less will be the tendency of the ball 16 to chatter when it is unseated during a bypass operation. The pressure within chamber 26 may be readily increased by increasing the restrictions of the ports 27. It has been found however that an excessive pressure within chamber 26 will obviate some of the important advantages of the valve construction and will result in increased valve noise as well as decreased pump pressure at the inlet 13. In consequence of the latter reduced pressure effect, operation of the power steering mechanism is impaired. It is accordingly preferred that the maximum pressure in chamber 26 should be such as to effect a resulting total lifting force on ball 16 and backing 19 in opposition to spring 22 which will amount to approximately 10% of the downward or ball seating force of spring 22.

Presumably the pressure in chamber 26 serves as a cushion for pressure oscillations in conduit 10 resulting from operation of the usual power steering pump. In addition the pressure in chamber 26 reduces the pressure differential across the opening at seat 17 when ball 16 is unseated and thus requires a larger spacing between ball 16 and seat 17 for any given rate of fluid flow. In consequence the restriction of ports 27 achieves an improved valve operating characteristic, as explained more fully below in regard to FIGURE 3, and in cooperation with the slidable seat 18 obtains optimum operating efficiency and freedom from valve noise.

The results of restricting ports 27 in FIGURE 1 are illustrated in FIGURE 3. A sharp valve operating characteristic is preferred as illustrated by the dotted pressure line P. If such a pressure characteristic could be obtained in practice, ball 16 would remain seated until a predetermined optimum pressure P is reached in conduit 10. The ball 16 would then unseat as required to enable sufficient bypass flow to maintain the desired pressure P in conduit 10.

In actual operation of the valve, the pressure increases to the right in FIGURE 3 to approximately $P_0$, at which pressure ball 16 initially tends to unseat from seat 17 to enable a minimum bypass flow. At pressure $P_0$, the bypass flow will be inconsequential, but will progressively increase as the pressure in duct 10 increases and swings ball 16 farther from its seated position. When the pressure in duct 10 increases to approximately P, which is the desired optimum pressure for the power steering motor, the bypass flow around the partially unseated ball 16 begins to be significant. Thereafter, unless the ports 27 are restricted as taught herein, materially increased pressure in duct 10 will be required to cause further unseating of ball 16 in the desired bypass operation of the valve, which in the usual automobile power steering system must bypass approximately 1.7 to 2 gallons of fluid per minute when ball 16 is fully unseated.

The characteristic of the pressure in duct 10 for such a valve will be determined by curve A, wherein the pressure required to completely unseat ball 16 is indicated at $P_1$ in the event that ports 27 are unrestricted and freely enable fluid flow therethrough to the return port 25 without materially increasing the pressure within chamber 26. Such a valve pressure characteristic is undesirable because the valve which is sufficiently open at P, for example 950 p.s.i., for an effective initial bypass flow does not open completely until pressure $P_1$ is attained, which for example may be 1100 p.s.i. In consequence, the fluid actuated power steering mechanism is subject to excessive pressure resulting in undue wearing of the parts and noise, particularly chattering of the ball valve 16 shortly after its initial unseating.

By suitable restrictive ports 27 to build up pressure in chamber 26 assisting the unseating of ball 16, a fluid flow and pressure characteristic approximating curve B can be attained whereby the ball 16 is fully unseated to enable the optimum desired fluid flow of approximately two gallons per minute at pressure $P_2$, which is appreciably lower than 1100 p.s.i. or $P_1$. The horizontal distance between curves A and B will be a measure of the pressure assist in chamber 26. The smaller pressure of curve B with respect to curve A at which ball 16 is unseated at any given rate of flow is compensated for by the assisting pressure in chamber 26.

By additionally restricting ports 27, a pressure characteristic approximating curve C will be obtained wherein the pressure within conduit 10 drops appreciably below the pressure P, as for example to $P_3$ or approximately 900 p.s.i. Such a pressure characteristic is undesirable because the pressure on conduit 10, which is also the pressure available to operate the fluid actuated power steering mechanism, is decreased to a value below the desired optimum operating pressure P and the operation of the power steering motor is impaired.

It has also been found that where the pressure characteristic recurves so that the pressure in duct 10 when the ball 16 approaches its fully unseated position falls below the maximum pressure in duct 10 during intermediate unseated positions of the ball 16, oscillating pressure forces are exerted on the ball tending to cause vibration and chattering with consequent noise and valve wear. Accordingly the optimum pressure characteristic that can be obtained with the structure illustrated in FIGURE 1 will resemble the curve B in FIGURE 3.

A modification of the present invention is illustrated in FIGURES 4 and 5 wherein the structure is the same as in FIGURE 1 except that the shiftable annular seat 18 is not employed. Instead a circular ball seating bore 18a is formed within backing 19 coaxially with stem 14. In this construction the clearance between the juxtaposed walls 20 and 14 is preferably maintained between approximately .003" and .008" to minimize lateral oscillation of cup member 19, 20, inasmuch as no sliding seat 18 is provided to relieve the member 19, 20 from vibrating fluid forces acting on ball 16. During bypass operation of the valve, the ball 16 seats against the circumferential chamfered inner edge of the bore 18a in fluid sealing relation to prevent fluid loss from chamber 26 except via ports 27 and an inconsequential leakage between walls 14 and 20.

The above-described structures obtain the advantages of a poppet-type valve, but avoid the additional expense and the noise characteristic of such valves. Also the valve closing characteristics of the valve described herein closely approximates the opening characteristic curve B shown and in this respect differs from the customary poppet-type valve wherein the opening and closing characteristics differ appreciably from each other. The operating conditions of the valve in FIGURES 1–5 depend upon a balance of the forces determined by the diameters of the ball 16 and seat 17, the fluid pressure in duct 10, the rate of fluid flow in the bypass circuit, the size of the ports 27, and the tension of spring 22 in cooperation with the effective area of the guide 19, 20 exposed to the pressure in chamber 26 tending to urge the guide 19, 20 upwardly.

It is apparent that the greater the surface area of the backing 19 exposed to the pressure within chamber 26, the less will be the pressure required to assist unseating of ball 16 in opposition to the tension of spring 22. Accordingly the smaller will be the velocity of discharge flow through orifices 27 and the larger will be orifices 27 required to achieve the desired optimum rate of flow. With a desired pressure in conduit 10 of approximately 950 to 1,000 p.s.i. and an optimum flow of approximately 1.7 to 2 gallons per minute through the bypass system when the ball 16 is fully unseated, 3/16" diameter seats 17, 18 and 18a for a ball 16 of approximately 1/4" diameter achieve satisfactory results wherein the inside diameter of chamber 26 is approximately 19/64" and the ports 27 are dimensioned to effect a total upward force approximating 10% of the downward force of spring 22 during conditions of the optimum bypass flow. With a total force of 27 lbs. exerted by spring 22 urging ball 16 downwardly toward seat 17, an assisting pressure of approximately 65 p.s.i. in chamber 26 at optimum conditions of bypass flow will be effected by two ports 27 having diameters approximating .063 inch. Such a pressure will result in a maximum upward assisting force of approximately 2.7 lbs. Of course the diameters of ports 27 will also vary somewhat depending on the thickness of the sidewalls of sleeve backing 19, 20, which is preferably of thin gauge sheet steel suitable for formation by customary stamping operations.

I claim:
1. In a high pressure ball relief valve for bypassing pressurized fluid at a variable rate of bypass flow ranging between zero and a predetermined maximum flow rate, a tubular conduit having an open end, a ball valve element adjustably seated at said open end to close the same, a cup-shaped guide containing said element and end of said conduit and being slidably sleeved on the latter to receive pressurized fluid through said open end when said element is unseated from said end, resilient means yieldably urging said guide in opposition to said pressurized fluid and against said element to urge the same into seated position at said end, said guide having fluid outlet means restricted to maintain an appreciable fluid pressure within said guide effective to urge said guide in opposition to said resilient means and to assist unseating of said element with a force amounting to approximately 10% of the total force acting to unseat said element as said bypass flow through said outlet means approaches said predetermined rate, said outlet means affording a comparatively unrestricted passage when said bypass flow rate is small, said guide including a backing element and a second seat for said element slidable on said backing surface to enable limited shifting of said second seat and element seated thereat transversely of the axis of said conduit.

2. In combination, bypass conduit means for passing pressurized fluid at a variable rate of flow ranging between a zero flow rate and a predetermined maximum flow rate, a shiftable valve element, a relatively shiftable valve seat means and guide means adapted to engage said element therebetween, said seat means having an opening therein defining a part of said conduit means and being closed by said element when the latter is seated therein, yieldable means urging said seat and guide means in opposition to each other to urge said element to its seated position at said seat means, said guide and seat means defining at least in part a chamber adapted to receive pressurized fluid through said opening when said element is unseated from said seat means and being urged in opposition to said yieldable means by said pressurized fluid in said chamber to facilitate unseating of said element, and fluid outlet means communicating with the interior of said chamber to discharge said pressurized fluid, said outlet means being dimensioned to afford unrestricted flow of said pressurized fluid therethrough when the rate of said flow is comparatively low and to effect appreciable resistance to said flow when the latter is at said predetermined maximum flow rate, thereby to effect a pressure in said chamber to facilitate unseating of said element with a force comprising approximately 10% of the total force required to oppose said yieldable means.

3. In combination, bypass conduit means for passing pressurized fluid at a variable rate of flow ranging between a zero flow rate and a predetermined maximum flow rate, a shiftable valve element, a relatively shiftable valve seat means and guide means adapted to engage said element therebetween, said seat means having an opening therein defining a part of said conduit means and being closed by said element when the latter is seated therein, yieldable means urging said seat and guide means in opposition to each other to urge said element to its seated position at said seat means, said guide and seat means defining at least in part a chamber adapted to receive pressurized fluid through said opening when said element is unseated from said seat means and being urged in opposition to said yieldable means by said pressurized fluid in said chamber to facilitate unseating of said element, and fluid outlet means communicating with the interior of said chamber to discharge said pressurized fluid, said outlet means being dimensioned to afford unrestricted flow of said pressurized fluid therethrough when the rate of said flow is comparatively low and to effect appreciable resistance to said flow when the latter is at said predetermined maximum flow rate, thereby to effect a pressure in said chamber to facilitate unseating of said element with a force comprising approximately 10% of the total force required to oppose said yieldable means, said outlet being also dimensioned so that the rate of change of the pressure upstream of said valve element is greater than zero throughout the variations in said variable flow rate as the latter increases from zero to said predetermined maximum rate.

4. In a high pressure ball relief valve for bypassing pressurized fluid at a variable rate of bypass flow ranging between zero and a predetermined maximum flow rate, a tubular conduit having an open end, a ball valve element adjustably seated at said open end to close the same, a cup-shaped guide containing said element and end of said conduit and being slidably sleeved on the latter to receive pressurized fluid through said open end when said element is unseated from said end, resilient means yieldably urging said guide in opposition to said pressurized fluid and against said element to urge the same into seated position at said end, said guide having fluid outlet means restricted to maintain an appreciable fluid pressure within said guide effective to urge said guide in opposition to said resilient means and to assist unseating of said element with a force amounting to a substantial part of the total force acting to unseat said element as said bypass flow through said outlet means approaches said predetermined rate, said outlet means affording a comparatively unrestricted passage when said bypass flow rate is small, said guide including a backing element and a second seat for said element slidable on said backing surface to enable limited shifting of said second seat and element seated thereat transversely of the axis of said conduit.

References Cited in the file of this patent

UNITED STATES PATENTS

| | | |
|---|---|---|
| 287,131 | Jarecki | Oct. 23, 1883 |
| 1,344,614 | Brock | June 29, 1920 |
| 1,701,305 | Meyers | Feb. 5, 1929 |
| 1,952,646 | Ackermann | Mar. 27, 1934 |
| 2,530,091 | Smith | Nov. 14, 1950 |
| 2,933,103 | Campbell | Apr. 19, 1960 |
| 2,995,147 | Gergoquist | Aug. 8, 1961 |